M. H. WICKMAN.
CHILD'S COASTER CART.
APPLICATION FILED SEPT. 29, 1919.
1,355,199.
Patented Oct. 12, 1920.
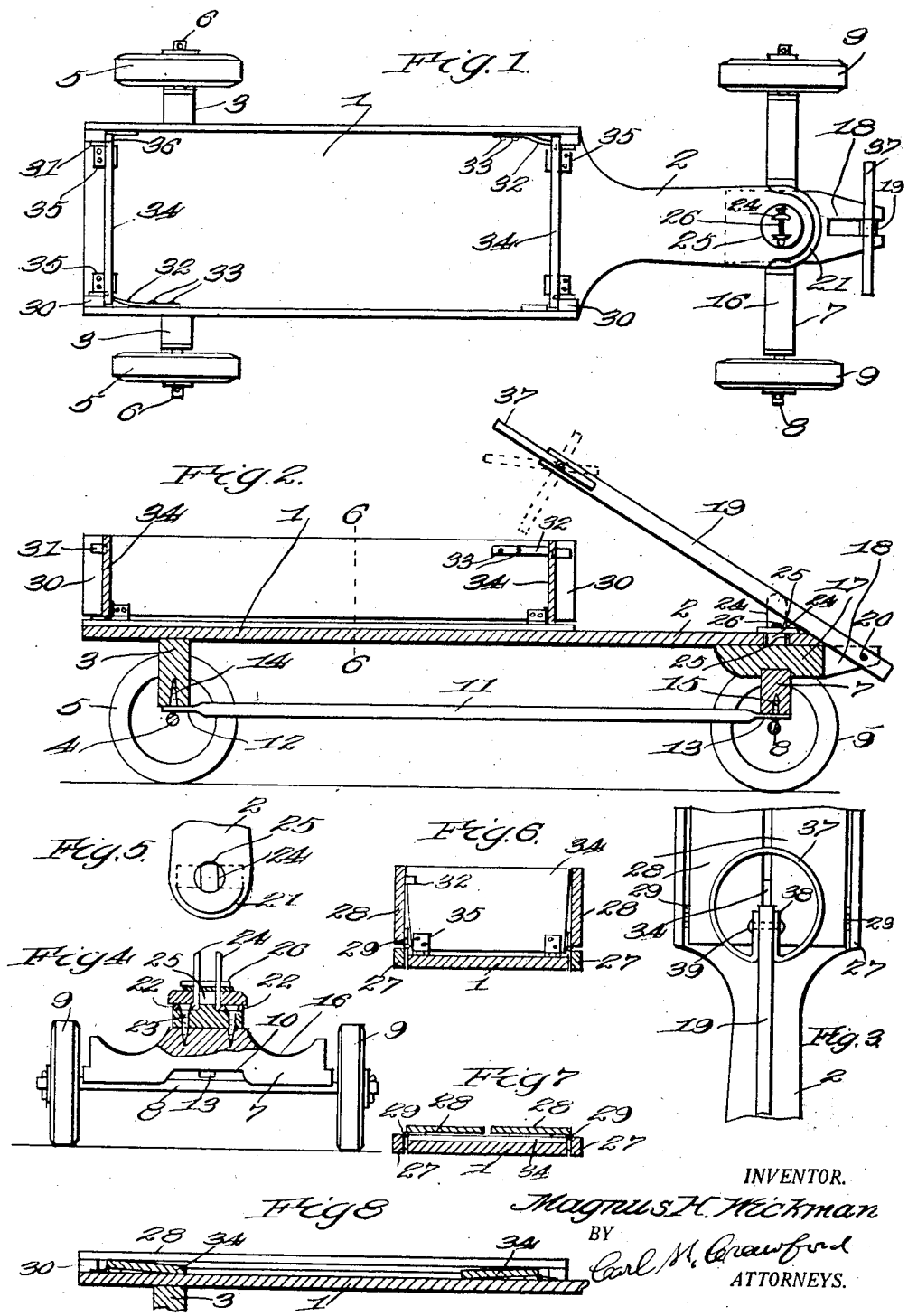
INVENTOR.
Magnus H. Wickman
BY
Carl M. Crawford
ATTORNEYS.

UNITED STATES PATENT OFFICE.

MAGNUS H. WICKMAN, OF SPOKANE, WASHINGTON.

CHILD'S COASTER-CART.

1,355,199.  Specification of Letters Patent.  Patented Oct. 12, 1920.

Application filed September 29, 1919. Serial No. 327,312.

*To all whom it may concern:*

Be it known that I, MAGNUS H. WICKMAN, a citizen of the United States, residing at Spokane, in the county of Spokane and State of Washington, have invented new and useful Improvements in Children's Coaster-Carts, of which the following is a specification.

This invention relates to improvements in carts or wagons for children.

One of the objects of this invention is to provide a wheeled cart which can either be drawn by pulling on the handle bar, as in the case of an ordinary wagon, or wherein the handle bar may be tilted backwardly over the body of the wagon when the latter is used for coasting.

Most coaster wagons have pivoted handle bars, rods or pillars, and in coasting, the wagon sometimes becomes unmanageable or erratic in its course by reason of the loose play that develops at the pivotal connection of the handle bar with the front steering portion of the wagon. Now it is one of the objects of this invention to entirely avoid the development of this loose play by a novel arrangement whereby the handle bar or pillar will be operatively associated with a king bolt device whenever it is tilted backwardly for use when coasting.

A further object is to provide a steering bolster structure with a novel form of king bolt device whereby the body of the wagon may be readily connected up or disconnected from the steering gear.

A further object is to provide a novel type of wheel for the handle bar which is adapted to be disposed in line with said bar when the wagon is being drawn forwardly by pulling the handle bar, and which is capable of being adjusted into angular relation with the handle bar when the wagon is being used for a coaster.

A further object of the invention is to provide the body of the wagon with collapsible box sections adapted to be folded or collapsed into flat superimposed relation on the body, to form a seat, when coasting, and adapted to be unfolded into an upright and box locked position when the cart is used for hauling sand or other material.

A further object is to so shape the body by reducing the width of its forward end so that the legs of the user can extend straight forwardly to bring the feet into engagement with the steering bolster.

Other objects and features will be more fully described in connection with the accompanying drawing and will be more particularly pointed out in and by the appended claims.

In the drawing:

Figure 1 is a plan view of a cart embodying my invention.

Fig. 2 is a longitudinal vertical sectional view thereof.

Fig. 3 is a plan view showing the parts in a coaster adjustment.

Fig. 4 is a front view of the steering bolster with a portion thereof in section to show the construction of the king bolt device.

Fig. 5 is a plan view of the king bolt device showing the manner in which the front of the body is applied thereto.

Fig. 6 is a sectional view on line 6—6 of Fig. 2, showing the sections locked in an upright position.

Fig. 7 is a similar view with the sections collapsed for coaster use.

Fig. 8 is a longitudinal sectional view similar to Fig. 2 with the sections collapsed as in Fig. 7.

Like characters of reference designate similar parts throughout the different figures of the drawing.

As illustrated, the device of my invention is provided with a body portion of relatively wide elongated rectangular form, as indicated at 1, and having a front portion 2 of materially reduced width with respect to the portion 1. A rear fixed bolster 3 is suitably secured to the body portion 1 and is provided with an axle 4 on which bearing wheels 5, are journaled. Pins 6 may serve to secure the wheels against shifting off from the axle. A front steering bolster 7 is likewise provided with an axle 8 on which wheels 9 are rotatable. The bolsters 3 and 7 are suitably recessed, as indicated at 10, as regards the front bolster, and a reach 11, which may consist of a pipe, has flattened ends 12 and 13. These ends 12 and 13 may be secured to the bolsters by means of screws 14 and 15.

I will next refer more particularly to the novel features of construction at the forward or steering end of the wagon.

The bolster 7 is recessed at 16, to receive the feet of the rider and it will be noted that these recessed portions are made accessible for use by the rider by reason of the reduced forward end 2, of the body. Thus when the parts are in the adjustment shown in Fig. 3, the legs of the rider are free to be extended forwardly to dispose the feet in the recessed portions 16. A steering head 17 is preferably mortised onto the top of the bolster 7, as shown in Fig. 2, and the top of the head 17 forms a relatively broad bearing surface on which the front of the body portion 2 directly rests. The head 17 is provided with a forwardly disposed fork 18 in which a handle bar 19 is pivoted at 20. The front end 21 of the body portion is suitably chamfered off and rounded so that by pivoting the handle bar 19 well toward the front of the fork 18, as shown, the handle bar 19 is capable of being tilted backwardly in overhanging, and into relatively close relation with the body 2.

A novel type of king bolt is provided which is specifically in the form of two strips of half-round iron, of L-shaped formation, as clearly shown in Fig. 4. The bases 22, of said members, are suitably recessed into the top of the steering head 17 and screws 23 serve to unite the king bolt device and the head 17 with the bolster 7, thereby forming what I may hereinafter refer to in the claims as a steering bolster structure. The upright portions of the L-shaped members, as indicated at 24, extend upwardly in suitable spaced relation with respect to each other. The front end of the body is provided with a king bolt opening 25 through which the portions 24 extend. Now it will be seen by reference to Fig. 5 that the rounded portions of the parts 24 engage the wall of the opening 25 and thereby function similar to a solid king bolt but with the novel distinction that the upper end of my king bolt device affords a fork into which the handle bar 19 may enter when tilted backwardly into the position shown in Fig. 2. Now it is by reason of the fact that this forked king bolt device is fixed to the steering bolster, and turns therewith, that it is capable of functioning in coaction with the steering bar when the latter is in a coaster adjustment thereby eliminating any lost motion because of the snug fit of the bar 19 between the members 24. This remains true, even though loose play may develop at the pivotal connection 20. Thus in my improved device, the steering bolster 7 cannot wabble and the resulting danger of an erratic coasting course is entirely avoided. In practice, I employ a washer 25 which is provided with openings corresponding to the cross section of members 24, and which washer fits in the position shown in Fig. 4. A cotter-pin 26 may be extended through holes in the members 24 to unite the body of the wagon in swiveled relation to the steering bolster structure.

The larger portion 1, of the body of the cart, is provided with side rails 27, fixed thereto. Box side sections 28 are hinged to the body 1 by hinges 29 to permit the sides 28 to be swung upwardly from the position shown in Fig. 7, to the position shown in Fig. 6. The box sides 28 are provided with end cleats 30 and the slight elevation afforded by the manner in which the sides 28 are hinged will permit the latter to fold down onto the body with the cleats 30 in substantial contact therewith, as shown in Fig. 8. The cleats 30 are provided with retaining strips 31, secured thereto, and each side 28 is also provided with an end locking device which may take the form of a flat spring 32. This spring 32 is fixed at 33 to the inner face of each box side 28, and the free end of each spring is tempered to extend inwardly, as shown in Fig. 1. My improved cart is provided with box end sections 34 which are hinged to the body 1 by hinges 35. The box ends 34 are provided with recesses 36 to receive the projecting ends of the retainers 31 so that when the sections are adjusted into an upright position the sides 28 will be locked against lateral spreading movement. When the box ends 34 are swung upwardly they will first flatten the free ends of springs 32, against the sides 28, until the box ends 34 are in the position shown in Fig. 1. Then the free ends of the springs, when released, will resiliently assume the position shown in Fig. 1 and will retain the box ends 34 in an upright position. It will be seen that the outward bulging strains to which the box sections may be subjected are not imposed upon the springs 32. For instance, the cleats 30 take the endwise bulging strains from sections 34, and the retainers 31 take the lateral bulging strains of sides 28. Therefore the sections, when in the adjustment shown in Fig. 1, are locked by structurally fixed parts. Ordinarily, the sides and ends would not be in an upright position, as shown in Fig. 2, when the wagon was used as a coaster, although the rider could kneel in the box and readily control the coaster by grasping the handle bar. However, it would be usual to dispose the sections flat, as in Figs. 3 and 7, when coasting. In this position, the coaster could carry numerous children.

My improved hand wheel, which is secured to the handle bar 19, is designated at 37, and may comprise a strip of metal bent into substantially circular form. The terminals of the strip, as indicated at 38, are bent inwardly, substantially radially, in a manner to lie on opposite sides of the free end of bar 19, to which they are pivoted, at 39. Thus in drawing the cart, the hand wheel 37 would be in line with the bar 19, but in the coasting adjustment, the hand wheel 37 could be adjusted into various angular positions with respect to the bar 19, as shown in Fig. 2. This affords the child a roomy hand grip for both hands and greatly increases the controlling leverage.

It is believed that the novelty and utility of my invention will be fully understood from the foregoing description, and while I have herein shown and described one specific form of my invention I do not wish to be limited thereto except for such limitations as the claims may import.

I claim:

1. In a child's coaster cart, a body having a reduced front end pivoted with a king bolt opening, rear wheels supporting said body, a steering bolster having top recessed portions to receive the feet of the rider and the said front end being sufficiently reduced to permit the legs of the rider to extend alongside of said front end, wheels for said bolster, a steering head fixed on said bolster and supporting said body and having a forwardly extending fork, a steering bar pivoted in said fork, and a king bolt device mounted on said head and extending through said opening and having its upper end forked whereby said bar may be tilted in overhanging relation with said body into the fork of the king bolt device with its free rear end accessible to the rider.

2. In a child's coaster cart, a body having a rear supporting wheel, a front wheeled steering bolster structure supporting said body at its forward end, a handle bar pivoted to said bolster structure and adapted to be tilted backwardly into a coasting adjustment in overhanging relation to said body, and a king bolt device secured to said bolster structure and in swiveled connection with said body and having means for engagement with said handle bar when the latter is in a coasting adjustment to prevent said bolster structure from wabbling.

3. In a child's coaster cart, a body having a king bolt opening therein, rear bearing wheels for said body, a front steering bolster structure supporting said body at its forward end and having a forked king bolt device extending through said opening and also provided with a handle bar fork, and a handle bar pivoted in said bolster fork and adapted to be tilted backwardly in overhanging relation with said body and into the fork of said king bolt device.

4. In a child's coaster cart, a body having a king bolt opening therein, rear supporting wheels for said body, a wheeled steering bolster structure supporting the forward end of said body and having a king bolt device formed of L-shaped half-round iron members having their shorter lengths recessed in and secured to said structure and the upper ends in such spaced relation as to engage the wall of said opening with their half-round portions.

5. In a child's coaster cart, a body having a king bolt opening therein, rear supporting wheels for said body, a front wheeled steering bolster, a steering head mortised on the top of said bolster and directly supporting said body, a king bolt device comprising strips of iron of L-shape projecting through said opening to form a king bolt and the bases of the L-shapes being recessed into said head, and means extending through said L-bases and said head and bolster to secure said head and said king bolt members to said bolster.

6. In a child's coaster cart, a wheeled body having a steering bolster, a handle bar pivoted to said bolster, and a hand wheel on the free end of said handle bar comprising a strip bent to substantially circular formation and having terminals pivoted to said handle bar whereby said hand wheel may be shifted into substantially parallel relation with said bar to pull the cart or into angular relation with respect thereto to steer the cart while coasting.

7. In a child's coaster cart, a body having a king bolt opening therein, a rear supporting wheel for said body, a wheeled steering bolster structure supporting the forward end of said body and having a king bolt device formed of L-shaped half-round iron strips having their shorter lengths recessed in and secured to said structure and their upper ends in such spaced relation as to engage the wall of said opening with their half-round portions and projecting above the top of said body to form a fork, a pin above said body and extending through said members to hold said body down onto said bolster structure, and a handle bar pivoted in said structure and adapted to be tilted backwardly over said body and into the open fork formed by said members.

8. In a child's coaster cart, a wheeled body having a steering bolster, a handle bar pivoted to said bolster, and a hand wheel on the free end of said handle bar comprising a strip bent to substantially circular formation and having terminals extending substantially radially inwardly of said ring and disposed on opposite sides of said handle bar and pivoted thereto whereby said hand wheel may be shifted into substantially parallel relation with said bar to pull the cart or into angular relation with respect thereto to steer the cart while coasting.

In testimony that I claim the foregoing as my own I hereby affix my signature.

MAGNUS H. WICKMAN.